(12) United States Patent
Kim (10) Patent No.: US 12,489,339 B2
(45) Date of Patent: Dec. 2, 2025

(54) DRIVING MOTOR HAVING BLDC MOTOR AND SWIVEL ACTUATOR USING THE SAME

(71) Applicant: AMOTECH CO., LTD., Incheon (KR)

(72) Inventor: Byung Soo Kim, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 318 days.

(21) Appl. No.: 18/282,178

(22) PCT Filed: Mar. 17, 2022

(86) PCT No.: PCT/KR2022/003726
§ 371 (c)(1),
(2) Date: Sep. 14, 2023

(87) PCT Pub. No.: WO2022/203279
PCT Pub. Date: Sep. 29, 2022

(65) Prior Publication Data
US 2024/0154494 A1    May 9, 2024

(30) Foreign Application Priority Data
Mar. 26, 2021  (KR) .................... 10-2021-0039480

(51) Int. Cl.
*H02K 7/116*  (2006.01)
*H02K 7/00*   (2006.01)
*H02K 7/08*   (2006.01)

(52) U.S. Cl.
CPC ........... *H02K 7/1166* (2013.01); *H02K 7/003* (2013.01); *H02K 7/083* (2013.01)

(58) Field of Classification Search
CPC ....... H02K 7/1166; H02K 7/003; H02K 7/083
See application file for complete search history.

(56) References Cited

U.S. PATENT DOCUMENTS 9,447,831 B2 *  9/2016 Goh ................. F16D 65/18
11,187,292 B2 * 11/2021 Song ................ B60T 8/17
(Continued)

FOREIGN PATENT DOCUMENTS

JP    2001112215 A   4/2001
KR   20100056758 A   5/2010
(Continued)

OTHER PUBLICATIONS

International Search Report—PCT/KR2022/003726 dated Jun. 29, 2022.

*Primary Examiner* — Terrance L Kenerly
(74) *Attorney, Agent, or Firm* — CANTOR COLBURN LLP (57) ABSTRACT

Provided is a swivel actuator including: a cylindrical housing with a hollow cylindrical portion protruding in a center thereof; a BLDC drive motor having a rotor rotatably installed around the hollow cylindrical portion; a cylindrical first worm gear integrally formed on an outer circumference of the rotor; first and second gear trains coupled to the first worm gear to reduce a rotation speed of the drive motor to generate a torque-increased rotational output; a rotary table rotatably coupled to the hollow cylindrical portion and a ring gear integrally formed inside a side surface portion; and first and second pinion gear units having lower end portions coupled to the other side of the first and second gear trains, respectively, and having an upper end portion coupled to the ring gear to transfer an torque-increased rotation output to the rotary table.

14 Claims, 9 Drawing Sheets

(56) References Cited

U.S. PATENT DOCUMENTS

2012/0031716  A1*  2/2012  Flodin .................... F16D 51/18
                                                    188/79.63
2017/0222517  A1   8/2017  Kobayashi

FOREIGN PATENT DOCUMENTS

| KR | 101323777 B1 | 10/2013 | | |
|---|---|---|---|---|
| KR | 20160041009 A | 4/2016 | | |
| KR | 20170050869 A | 5/2017 | | |
| KR | 20180014304 A | 2/2018 | | |
| TW | 202013622 | * 12/2020 | .............. | F04C 23/02 |

* cited by examiner

DRIVING MOTOR HAVING BLDC MOTOR AND SWIVEL ACTUATOR USING THE SAME

TECHNICAL FIELD

The present invention relates to an actuator, and more particularly, to a drive motor provided with a slim brushless direct-current (BLDC) motor vertically mounted in a housing, and a swivel actuator using the drive motor.

BACKGROUND ART

An electric actuator rotates or linearly moves a table (or a passive object) to be driven with a high torque rotational force obtained by torque conversion of the rotational force generated from a rotating power source.

In general, a conventional actuator uses a DC motor as a rotating power source, and the rotor output of the DC motor is torque-converted through a gear train in which a worm gear and a plurality of spur gears which are integrally formed in a rotor output end are gear-engaged to generate a high torque rotational output from an actuator output end.

Since the conventional electric actuator uses a DC motor with an external casing as a rotating power source, the magnet for position sensing of the rotor is not embedded in the casing, but attached separately to the outside and sensed using a Hall sensor, so the structure of connecting the Hall sensor from the PCB with the motor driving circuit is complicated.

If the actuator does not use a Hall sensor, only forward and reverse rotational motions are possible.

In general, the actuator has a low height of the housing as a whole product in use, and one of the horizontal and the vertical is configured to have a long shape. Accordingly, it is difficult to employ a structure in which a DC motor having an outer casing is vertically mounted on the inner bottom of the housing.

In the case of using a DC motor, the brake torque should be increased using a worm gear because the rotor should be held in a stationary position when external pressure is applied on the output shaft that rotates forward and reverse.

To use a worm gear and a worm wheel in a DC motor and to deliver power to the position where the output shaft is located, the connection therebetween is usually formed using a spur gear, in which case the following problems exist.

First, since the housing height of the actuator is low, there is a problem in that a DC motor is generally laid and applied, and thus an assembly structure is difficult and a unit cost is increased. That is, there is a problem in securing an assembly space due to the casing of the DC motor and the bearing that needs to hold the worm shaft.

Second, the structure of connecting the motor power in a controller becomes complicated.

Third, position information of the rotor is required for accurate position control in the actuator. To this end, since a position sensing magnet is placed at the bottom of a warm gear of a DC motor and a position sensing Hall sensor IC is applied, the structure of connecting a Hall sensor to a printed circuit board (PCB) is complicated to use DC power and to sense the position.

Fourth, in a gear train that uses multiple spur gears to obtain a large reduction ratio, the tolerance the rotating power of the drive motor increases, resulting in a large backlash and difficulty in controlling the precise position.

Korean Patent Application Publication No. 10-2017-0050869 (Patent Document 1) discloses an electric actuator using a direct-current (DC) motor, including: a power input unit including the DC motor; a planetary decelerator including a planetary gear for increasing torque by receiving a driving force from the power input unit and having an output shaft; an accelerator with a detachable cover that receives driving force from the planetary decelerator, increases the number of rotations lowered in proportion to the increased torque, and opens one side; a screw shaft having a screw thread to convert the rotational motion transmitted from the accelerator into a linear motion; and a cylinder unit having a displacement nut screw-coupled to the screw shaft in a rotational manner to move forward and backward by rotating of the screw shaft.

As the electric actuator of Patent Document 1 uses a DC motor, precise position control is difficult, and assembly productivity is reduced by adopting the planetary decelerator for torque enhancement.

In general, when the size of the actuator is small, the size of the drive motor is small, and thus the output becomes small. In this case, in order to obtain a high torque output value at the output terminal of the actuator, the rpm of the motor should be large, and the reduction ratio should be large using multiple spur gears, resulting in an increase in noise.

Recently, a variable headlamp that may maximize the driver's night view in conjunction with the driver's steering direction has been proposed, and a motor equipped with a lead screw may be used as a swiveling actuator that implements the swiveling and leveling of the headlamp.

Korean Patent Application Publication No. 10-2018-0014304 (Patent Document 2) proposes a swivel actuator that may minimize operating noise and vibration generation and improve assembly and productivity by improving the assembly composition and coupling structure of the actuator that moves the vehicle headlamp.

Patent Document 2 employs a transfer screw that changes the rotating power of the motor into a straight line motion to move a ramp moving unit coupled to the transfer screw.

DISCLOSURE

Technical Problem

To solve the conventional problems, it is an objective of the present invention to provide a swivel actuator that rotates a rotary table left and right by a power transmission structure capable of minimizing backlash by a gear train changing structure in which a worm wheel and a worm gear are integrally formed at intervals on a power transmission shaft to minimize the number of coupling gears.

It is another objective of the present invention to provide a swivel actuator, capable of minimizing backlash and simultaneously suppressing vibration generation of a rotary table, by installing a BLDC drive motor on the bottom of a housing, and arranging, inside the housing, first and second gear trains, in a symmetrical structure, in which a worm wheel and a worm gear are integrally formed with a distance from a power transmission shaft, in comparison with a conventional technology in which a motor unit, a gear unit, and a rotating unit are separately assembled to the inside and the outside of the housing.

It is another objective of the present invention is to provide a swivel actuator capable of removing a tolerance generated when coupling between gears, and making a backlash as zero, by suppressing left and right displacement of both ends of a power transmission shaft in a bearing housing.

It is another objective of the present invention to provide a drive motor in which a BLDC motor is vertically assembled in the form of a bare motor on the bottom of a housing, and a swivel actuator using the drive motor, to improve a problem of a conventional structure of using a DC motor laid inside a housing having a low height.

Technical Solution

According to an aspect of the present invention, there is provided a drive motor for a swivel actuator including: a cylindrical housing having a hollow cylindrical portion protruding from a bottom thereof at a center thereof and a step portion protruding on an inner sidewall; a rotor rotatably coupled to an outer circumference of the hollow cylindrical portion; and a stator arranged on the bottom of the housing to rotate the rotor by generating a rotating magnetic field while having an air gap on an outside of the rotor, wherein a first worm gear is integrally formed on an outer circumferential portion of an extension unit extending to an upper portion of the rotor, and the stator is arranged on a lower side of the step portion.

The rotor may have a rotor support with a cup-shaped lower end, and the drive motor may further include at least one bearing arranged between the cup-shaped lower end of the rotor support and a lower end of the hollow cylindrical portion to rotatably support the rotor.

The housing includes: a cylindrical body case with open upper and lower portion and a step portion protruding inside; and a circular lower cover with an outer circumferential portion fixed to the lower end of the cylindrical body case and a hollow cylindrical portion protruding in the center thereof, wherein the drive motor may be arranged on the lower side of the step portion, and a gear train for reduction and a pinion gear unit may be installed at the top of the step portion.

In this case, the drive motor for the swivel actuator may further include: a rotary table rotatably installed between the body case of the housing and the hollow cylindrical portion, and having a driven body installed on the upper surface thereof; and a third bearing for rotatably supporting the rotary table on the outer circumference of the hollow cylindrical portion.

In addition, the drive motor for the swivel actuator may further include an oil seal installed between the rotary table and the housing.

According to another aspect of the present invention, there is provided a swivel actuator including: a cylindrical housing in which a hollow cylindrical portion protrudes from a bottom of a center thereof and first and second step portions protrude from an inner side wall thereof; a drive motor which is arranged on a bottom surface of the housing and has a cylindrical first worm gear integrally formed on an outer circumference of a cylindrical extension unit extending to an upper portion of the rotor; first and second gear trains which are arranged to face each other on the upper portion of the second step portion, respectively, and are coupled to the outer circumference of the first worm gear in which second and third worm wheels gear-coupled to the first worm gear are respectively formed on either one side of first and second power transmission shafts, and second and third worm gears are respectively formed on the other sides of the first and second power transmission shafts; first and second pinion gear units having fourth and fifth worm wheels formed at lower ends thereof to be gear-coupled to the second and third worm gears, respectively, and having first and second pinion gears integrally formed at the upper ends thereof; a rotary table in which the first and second pinion gears of the first and second pinion gear units are gear-coupled to a ring gear formed integrally on an inner side of a side surface portion thereof to rotate; and a plurality of set screws for pushing and fixing the first and second power transmission shafts to one side, wherein the axial displacement of the first and second power transmission shafts is suppressed by tightening the set screws from the outside through set screw adjustment through-holes formed in the housing.

The cylindrical extension unit extending to the upper portion of the rotor and the cylindrical first worm gear may be vertically set on the bottom surface of the housing, and the first and second power transmission shafts may be installed in a horizontal direction orthogonal to the axis of the cylindrical first worm gear, and the first and second support shafts may be installed in a vertical direction orthogonal to the first and second power transmission shafts, respectively.

In this case, when the rotor and the first worm gear of the drive motor rotate clockwise, the first and second power transmission shafts may rotate counterclockwise, and the first and second support shafts and the rotary table may rotate clockwise.

According to another aspect of the present invention, there is provided a swivel actuator including: a cylindrical housing having a hollow cylindrical portion protruding in a vertical direction from a bottom thereof at a center thereof; a brushless direct-current (BLDC) drive motor installed on the bottom of the housing in a vertical direction to allow a rotor to rotate around a hollow cylindrical portion; a cylindrical first worm gear integrally formed on an outer circumference of a cylindrical extension part extending to an upper portion of the rotor; first and second gear trains each having one side coupled to an opposite outer circumference of the first worm gear to reduce a rotational speed of the drive motor to generate a torque-increased rotational output; a rotary table having a central portion rotatably coupled to the hollow cylindrical portion of the housing and a ring gear integrally formed inside a side surface portion thereof; and first and second pinion gear units of which lower end portions are respectively coupled to the other sides of the first and second gear trains and upper end portions are inscribed in an inner circumferential portion of the ring gear facing the ring gear, to transfer a torque-increased rotational output to the rotary table, wherein the first and second gear trains include first and second power transmission shafts each having a worm wheel formed on one side thereof to be gear-coupled to the first worm gear and a second worm gear formed on the other side thereof to be gear-coupled to the ring gear, and one or both ends of the first and second power transmission shafts are supported by a plurality of set screws to suppress the occurrence of axial displacement.

The first and second power transmission shafts each further include: a pair of bearings installed in a step portion protruding from an inner wall of the cylindrical housing to support both ends to be able to rotate; a pair of bearing housings that accommodate and support the pair of bearings; a pair of set screw assembly units formed to extend from the rear ends of the pair of bearing housings; and a pair of set screws which are screw-coupled to the set screw assembly units so that a front end portion thereof supports end portions of the power transmission shafts, wherein the set screws may suppress axial displacement of the first and second power transmission shafts by pushing and fixing the first and second power transmission shafts to one side from the outside through set screw adjustment through-holes formed in the housing.

In addition, the drive motor includes: a rotor provided with a rotor support which is rotatably coupled to the outer circumference of the hollow cylindrical portion and has a lower end portion which is formed in a cup shape; and a stator arranged on the bottom of the housing outside the rotor, to rotate and drive the rotor, wherein the swivel actuator may further include: a lower bearing arranged between the cup-shaped lower end of the rotor support and the lower end of the hollow cylindrical portion of the housing so as to rotatably support the rotor; and an upper bearing for rotatably supporting the rotary table on an outer circumference of the hollow cylindrical portion.

In addition, the swivel actuator according to the present invention may further include a ring-shaped stopper inserted between the lower bearing and the upper bearing installed on the outer circumference of the hollow cylindrical portion to set the relative positions of the lower bearing and the upper bearing.

In addition, the rotary table includes: an upper plate on which a driven body is installed; a side surface portion extending downward from an outer circumferential portion of the upper plate; and a ring gear integrally formed inside the side surface portion, wherein the first and second pinion gears of the first and second pinion gear units may be gear-coupled to the ring gear of the rotary table.

Advantageous Effects

As described above, in the present invention, a worm wheel and a worm gear are integrally formed at intervals on a power transmission shaft to provide a power transmission structure capable of minimizing backlash by a gear train change structure in which the number of coupling gears is minimized. As a result, the present invention may reduce overall size and secure a space compared to a conventional gear train in which a plurality of spur gears are combined, thereby increasing degree of freedom in design and reducing costs.

In addition, according to the present invention, a BLDC drive motor is installed on the bottom of a housing, and first and second gear trains, in which a worm wheel and a worm gear are integrally formed at intervals on a power transmission shaft, are arranged in a symmetrical structure in the housing, thereby minimizing backlash and simultaneously suppressing vibration generation of the rotary table.

As described above, when the first and second gear trains are arranged in a symmetrical structure inside the housing, it is possible to reduce a tolerance between gears, but it is difficult to completely reduce the tolerance. In other words, the gap between the gears is minimized, but the tolerance between the gears occurs, resulting in a gap between the gears, which may cause a driven body (e.g., the rotary table) gear-coupled with the pinion gear unit to shake left and right.

This problem may be caused by the occurrence of the left and right (i.e., axial) displacement of both ends of the power transmission shafts forming the gear train in the bearing housing. Accordingly, in the present invention, a set screw screw-coupled to a set screw assembly unit formed to extend to the rear end of the bearing housing is added to suppress occurrence of left and right displacement of both ends of the power transmission shafts in the bearing housing, and axial displacement of the first and second power transmission shafts may be suppressed by pushing and fixing the first and second power transmission shafts to one side by tightening the set screw from the outside through set screw adjustment through-holes formed in the housing.

As a result, by suppressing the left and right displacement of the first and second power transmission shafts, the tolerance (gap) that occurs when the gears are coupled between the worm gear of the gear train and the worm wheel of the pinion gear unit is eliminated, and as a result, the gap between the pinion gear of the pinion gear unit and the ring gear of the driven body (e.g., the rotary table) may be removed to zero the backlash.

Further, in the present invention, a BLDC motor of a vertical assembly structure is provided with a structure of assembling a bare motor-shaped BLDC motor on the bottom of a housing, to improve the problem of the conventional structure of using a DC motor laid inside a low-height housing.

In addition, according to the present invention, there may be provided an internal hollow swivel actuator in which a BLDC motor is installed on the bottom of a housing to have a compact and slim structure and a gear train for reduction is installed at an upper portion thereof, thereby more compactly deforming the gear train for reduction, compared to a conventional technology in which a DC motor is installed outside a rotary table.

The present invention may provide an actuator whose size is miniaturized by optimally arranging a power transmission shaft inside a housing in which a worm wheel and a worm gear constituting a small drive motor and a gear train are integrally formed.

BEST MODE FOR CARRYING OUT THE INVENTION

Hereinafter, embodiments of the present invention will be described in detail with reference to the accompanying drawings.

The sizes and shapes of the components shown in the drawings may be exaggerated for clarity and convenience. In addition, terms defined in consideration of the configuration and operation of the present invention may vary depending on the intention or custom of the user, the operator, and the like. Definitions of these terms should be based on the content of this specification.

A swivel actuator according to the present invention is used for rotating a passive object main body to the left and right together with a rotary table. In the following description, an inner hollow swivel actuator for driving a passive object by using a BLDC-type drive motor as a power source is described.

It is difficult to apply a BLDC motor to a general motor, but in this invention, the BLDC motor is vertically erected and the size of the BLDC motor in a radial direction is increased to increase motor torque. The drive motor has a stator and a rotor arranged on the bottom surface of the housing, and uses an inner rotor type BLDC motor.

An actuator according to the conventional art includes a motor portion made of a DC motor, a gear part, and a rotating part, which are configured as separate components, so when assembling the actuator to a main body using an actuator product, there are many problems such as assembly tolerance and supply of parts.

An actuator according to the present invention includes a drive motor, a gear train, and a rotating body, which are integrally formed, to thereby achieve miniaturization and slimness while solving the problems of conventional technology.

A swivel actuator according to the present invention may be applied for rotating, together with a rotary table, a passive object installed in the rotary table.

A swivel actuator according to this invention includes a BLDC-type drive motor, a gear train that transmits the rotational power of the drive motor to a rotary table and increases torque by reduction, and the rotary table which is rotated by an output of the gear train, wherein a passive object is coupled to the rotary table so that the passive object is rotated together with the rotary table.

In this case, the drive motor, the gear train, and the rotary table are integrally assembled to the housing.

An inner hollow swivel actuator according to the present invention is formed in a disc shape, and includes a through-hole for withdrawing a cable, which is formed in a central portion thereof as an inner hollow shape, and a plurality of coupling holes, for example, four coupling holes, which are formed on an upper portion of a rotating body (a rotary table) so as to be connected to a passive object, in which a lower end portion of a fixing bolt passes through each of the coupling holes so as to be screw-coupled to and fixed to a stud nut fixedly installed on an inner surface of the rotary table.

An actuator according to the present invention has an annular stator arranged on the bottom of the housing and a rotor arranged therein and having a worm gear integrally formed on the upper side thereof. A worm wheel of a power transmission shaft forming a gear train is gear-engaged with the worm gear of the rotor, a worm gear formed on the other end of the power transmission shaft is coupled to a worm wheel located at the lower end of a pinion gear unit, and a pinion gear located at the upper end of the pinion gear unit is coupled to a ring gear formed inside a lateral surface portion of a rotary table, so as to rotate the rotary table.

The inner hollow swivel actuator of this invention may minimize backlash and suppress vibration generation by installing a BLDC-type drive motor on the bottom of a housing and placing, in a symmetrical structure inside the housing, first and second gear trains in which a worm wheel and worm gear are integrally formed at intervals on a power transmission shaft.

Referring to FIGS. 1 to 7, the inner hollow swivel actuator 200 according to a preferred embodiment of the present invention includes: a cylindrical housing 10 in which a hollow cylindrical portion 11a protrudes at a center thereof and first and second step portions 12a and 12b protrude from an inner side wall thereof a drive motor 100 which is arranged on a bottom surface of the housing 10 and has a first worm gear 35 integrally formed on an outer circumference of an extension unit extending to an upper portion of the rotor 30; first and second gear trains 70a and 70b which are arranged in opposition to each other on the upper portion of the second step portion 12b, respectively, and coupled to the outer circumference of the cylindrical first worm gear 35 in which second and third worm wheels 72a and 72b gear-coupled to the first worm gear 35 are respectively formed at one-side portions of first and second power transmission shafts 71a and 71b, and second and third worm gears 73a and 73b are respectively formed at the other sides of the first and second power transmission shafts 71a and 71b; first and second pinion gear units 80a and 80b in which fourth and fifth worm wheels 81a and 81b gear-coupled to the second and third worm gears 73a and 73b are formed at the lower ends of first and second support shafts, respectively, and first and second pinion gears 82a and 82b are integrally formed on the upper ends of the first and second support shafts, respectively; and a rotary table 20 configured to rotate in which the first and second pinion gears 82a and 82b of the first and second pinion gear units 80a and 80b are gear-coupled to a ring gear 24 integrally formed on the inner side of the side surface portion.

The housing 10 includes: a cylindrical body case 12 with upper and lower portions opened and two-stage first and second step portions 12a and 12b protruding inside; and a circular lower cover 11 having a lower end supported by an outer periphery of the body case 12 and the hollow cylindrical portion 11a protruding from the center thereof.

Figure 1:
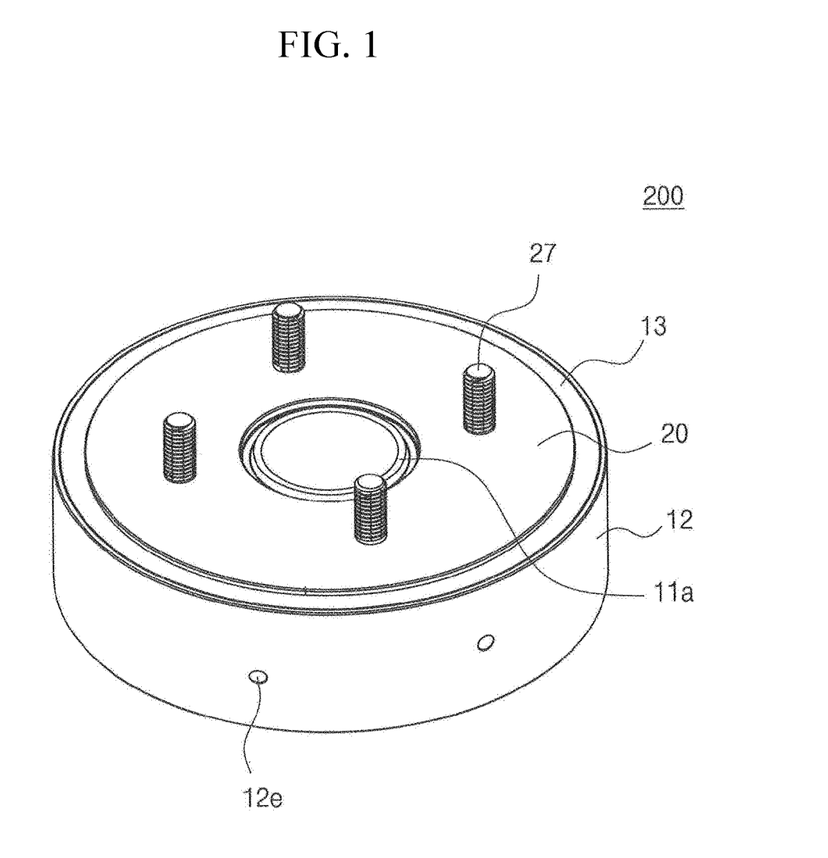
FIGS. 1 to 3 are a perspective view, a plan view, and a cross-sectional view taken along line A-A of FIG. 2, respectively, of an internal hollow swivel actuator according to a preferred embodiment of the present invention.
Figure 2:
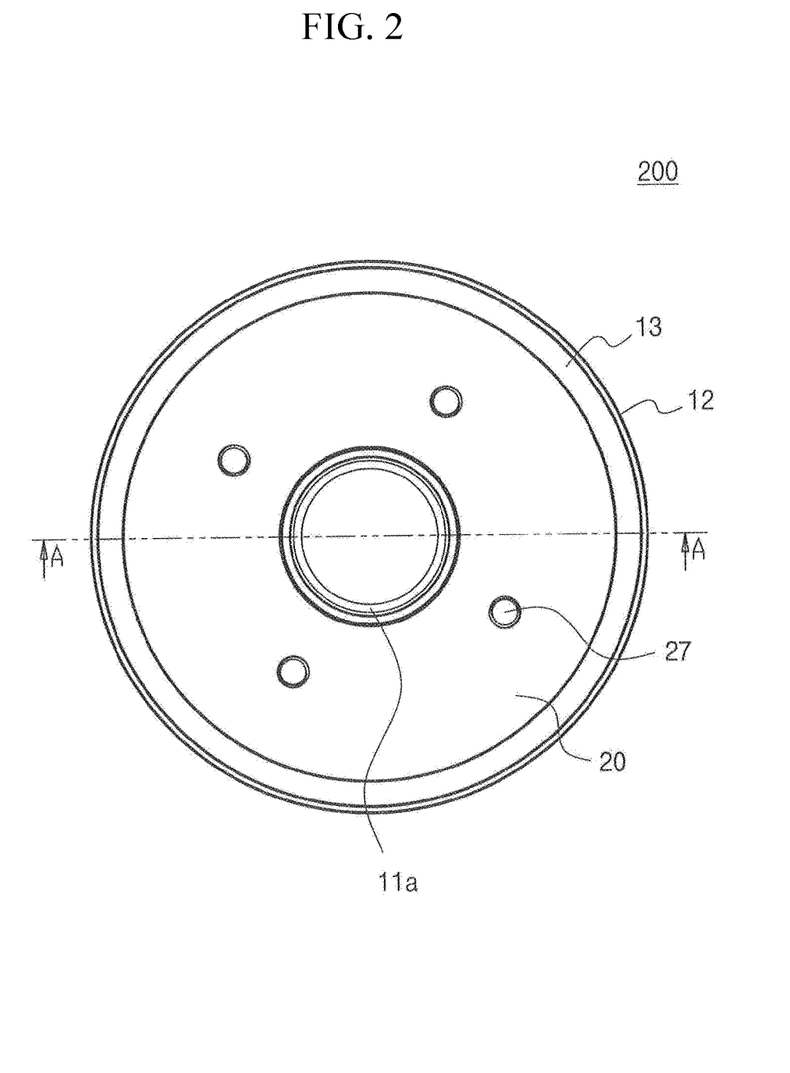
Figure 3:
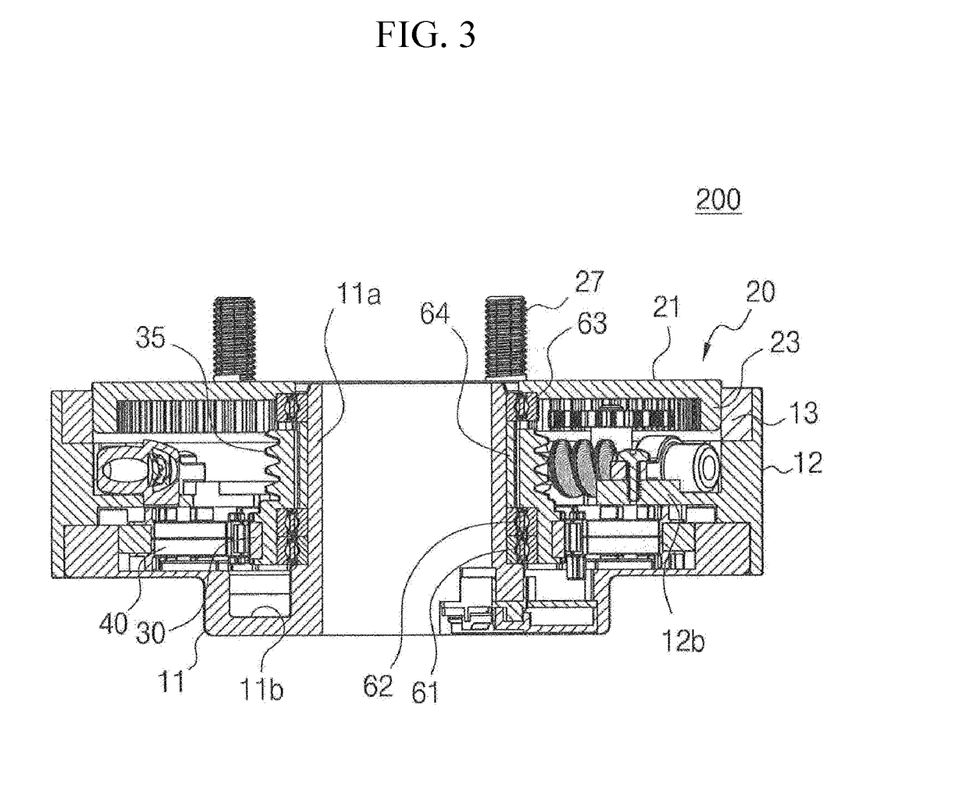
Figure 4:
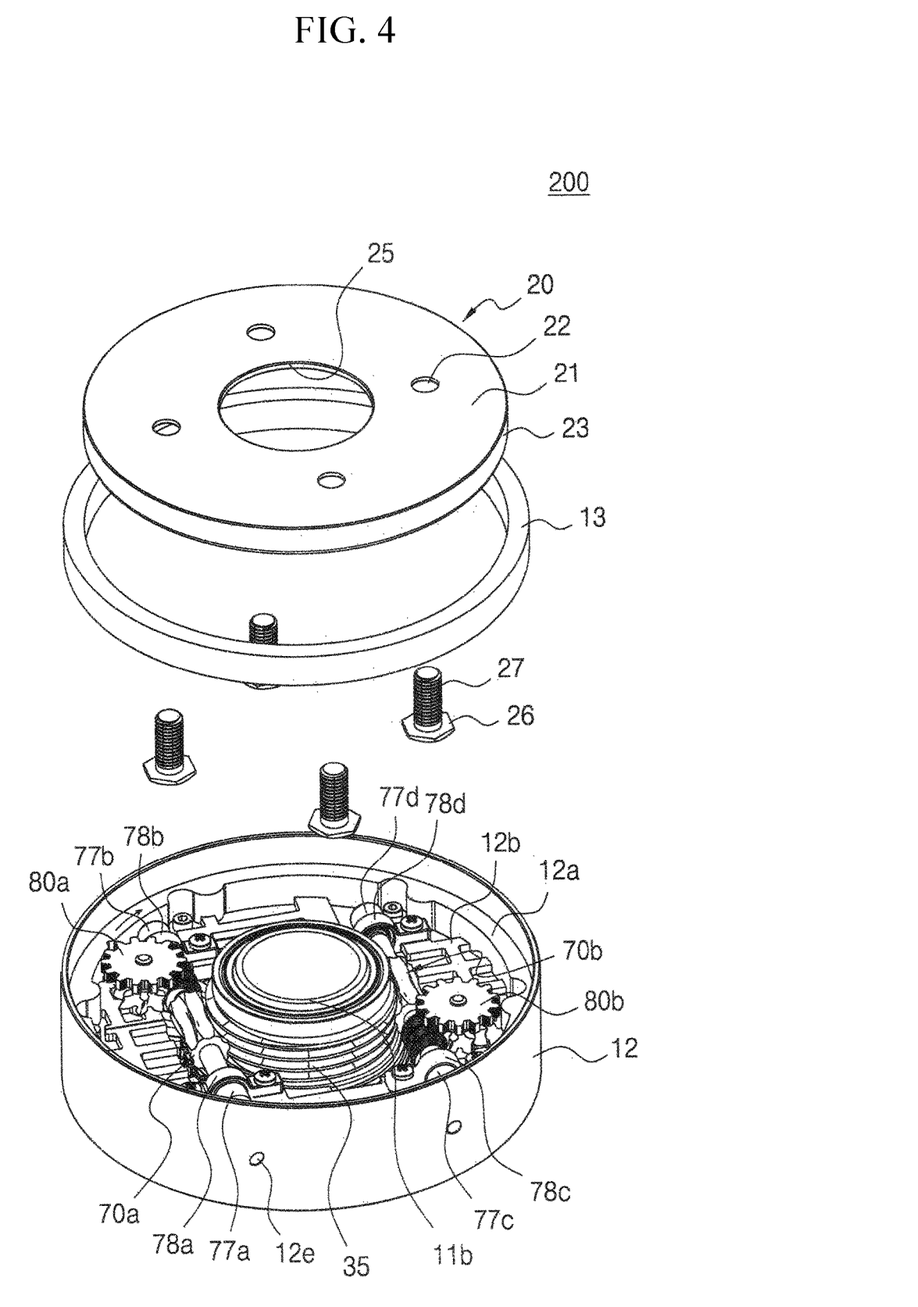
FIGS. 4 to 7 are an exploded perspective view of a rotary table of an inner hollow swivel actuator according to a preferred embodiment of the present invention, a plan view of FIG. 4 in which the rotary table is removed, a cross-sectional view taken along line B-B of FIG. 5, and a cross-sectional view taken along line C-C of FIG. 5, respectively.
Figure 6:
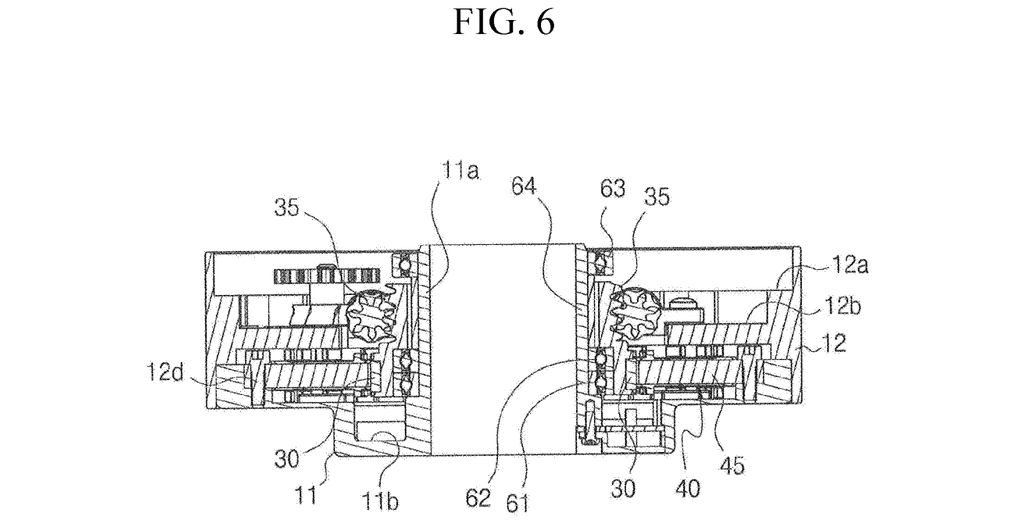
Figure 7:
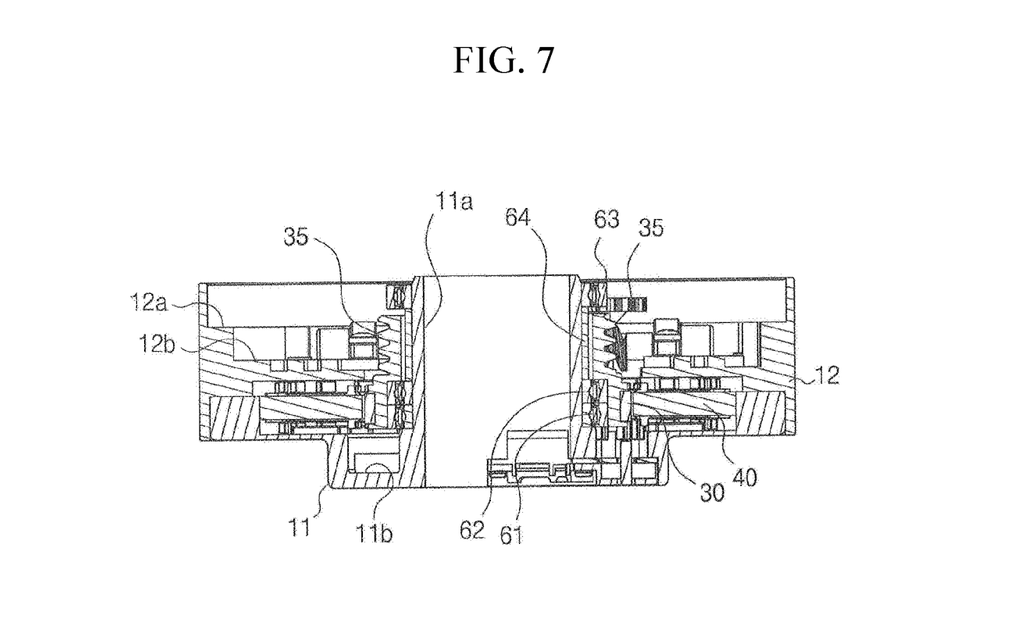
Figure 8:
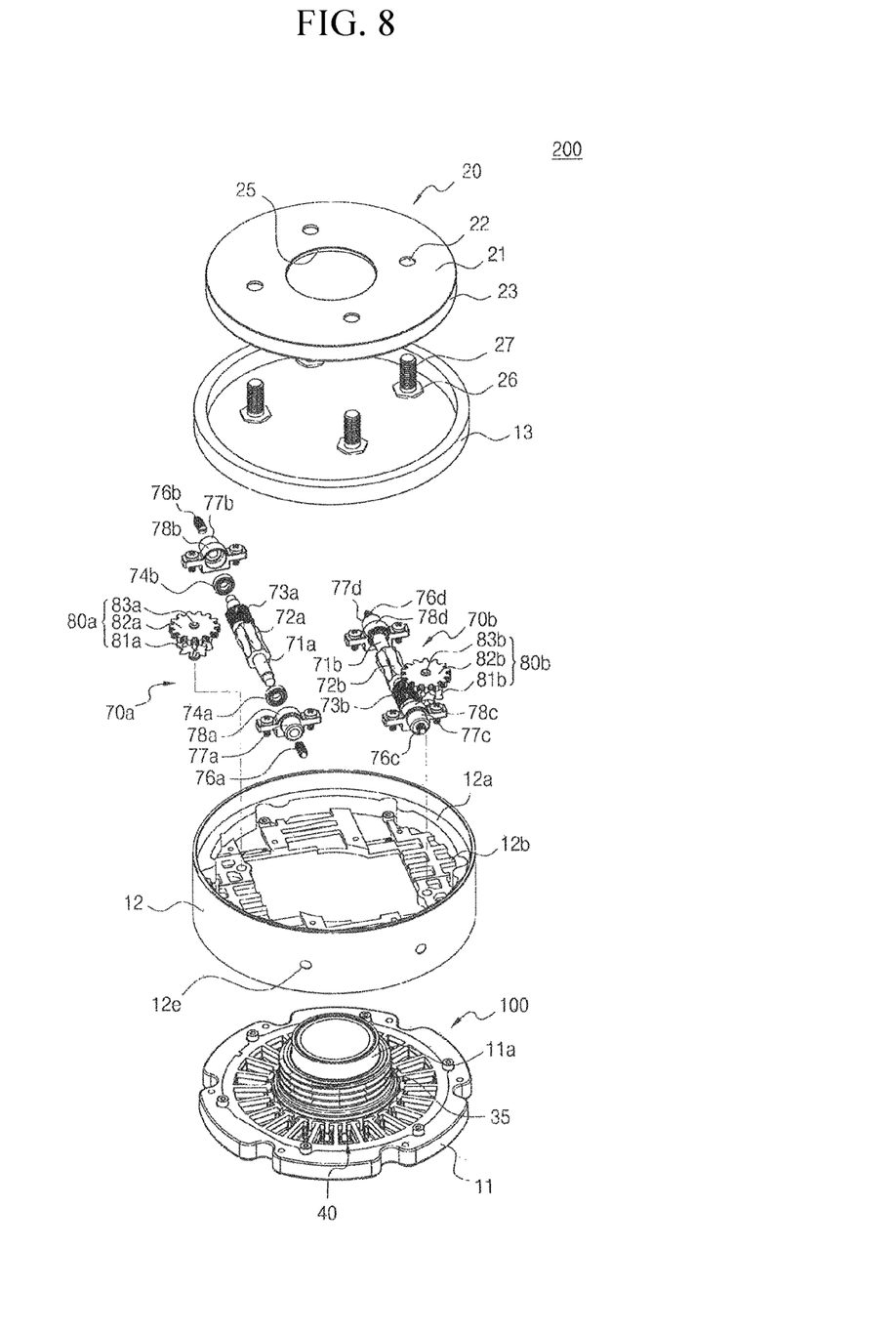
FIGS. 8 and 9 are a module—each exploded perspective view and a fully exploded perspective view of an inner hollow swivel actuator according to a preferred embodiment of the present invention, respectively.

The drive motor 100 may be configured as an inner rotor type in which a rotor is arranged inside a stator, and includes the rotor 30 rotatably coupled to the outer circumference of the hollow cylindrical portion 11a of the lower cover 11, and the stator 40 arranged at an outer side of the rotor 30 with an air gap therebetween and arranged on an upper surface of the lower cover 11 to rotate the rotor 30 by generating a rotating magnetic field, wherein the first worm gear 35 is integrally formed on the outer circumferential portion of the extension portion extending to the upper portion of the rotor 30.

In the rotor 30, a magnet 31 arranged on the outer circumference of a back yoke 32 located inside the rotor 30, may include a magnet which includes split magnet pieces of a plurality of N-poles and S-poles or a magnet in which N-poles and S-poles are split-magnetized in multiple poles in a ring-shaped magnet. The back yoke 32 is installed on a rear surface of the magnet 31 to form a magnetic circuit.

The stator 40 includes: a stator core 45 having the plurality of teeth 41 formed in a "T" shape and the back yoke 42 connected to the plurality of teeth 41 to form a magnetic circuit; the upper and lower insulators 44a and 44b of an insulating material integrally formed to surround the outer circumferential surface around which the coil 43 is wound in each of the plurality of teeth 41; and the coil 43 wound around the outer circumferential surfaces of the upper and lower insulators 44a and 44b.

In this case, the insulator 44a and 44b may be integrally formed as a bobbin and a stator support surrounding the back yoke 42 along with the plurality of teeth 41.

Figure 9:
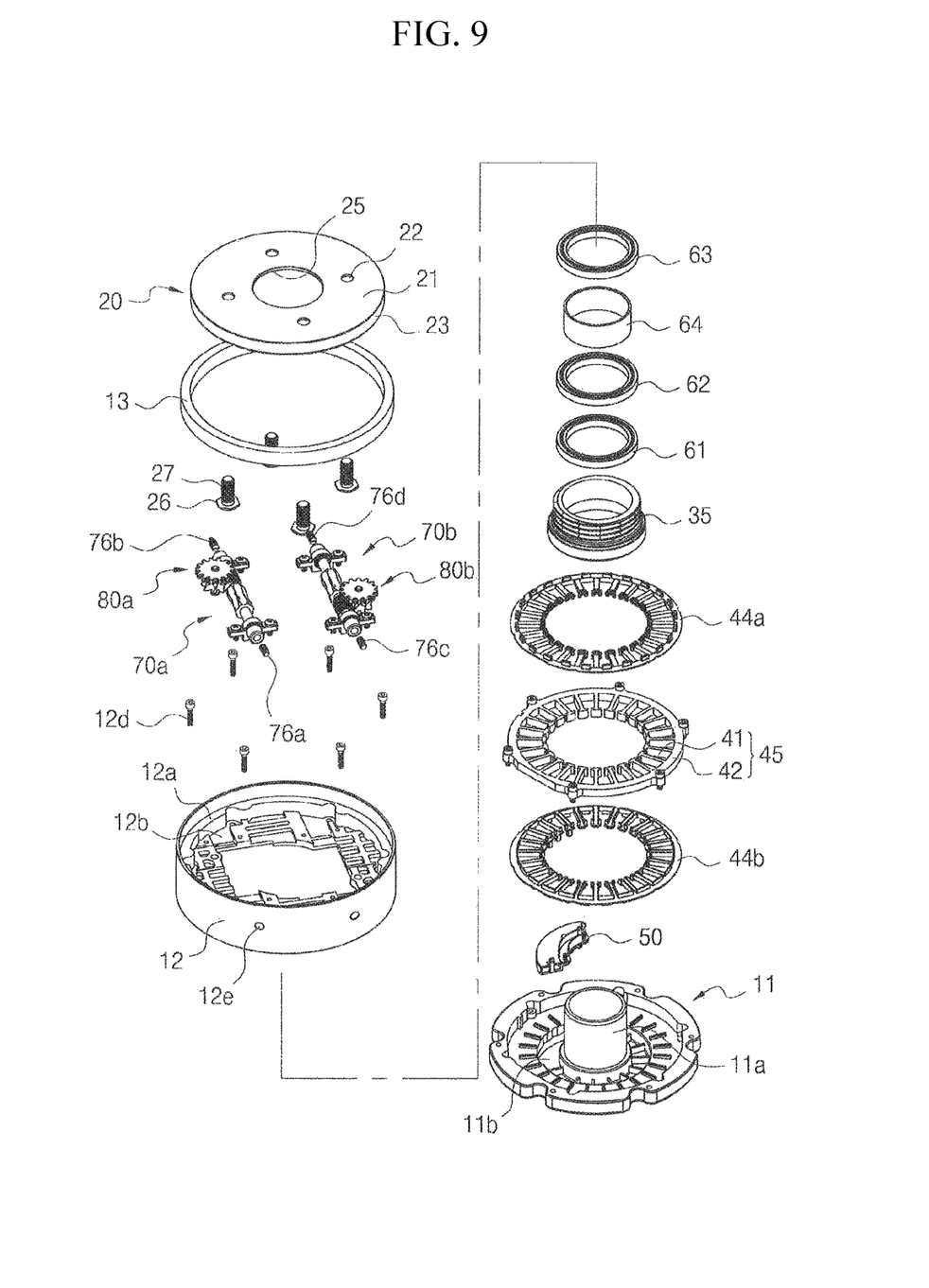
Figure 10:
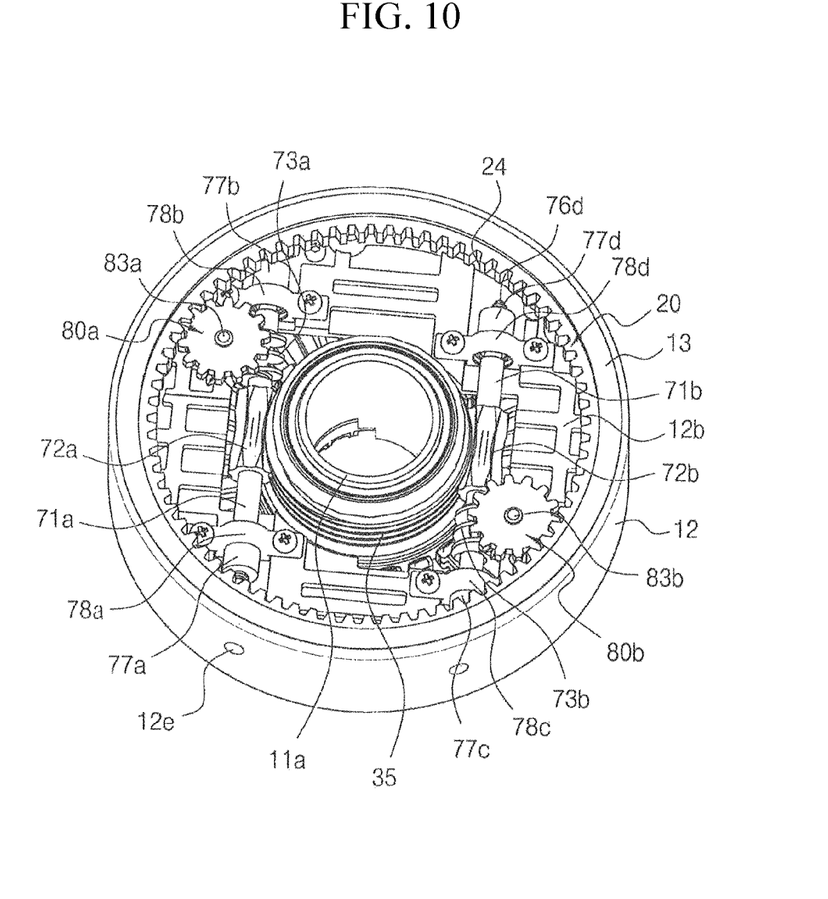
FIG. 10 is a perspective view showing a power transmission mechanism for driving a ring gear through a pair of power transmission shafts and a pair of pinions from a rotor of a drive motor according to a preferred embodiment of the present invention.

An annular groove 11b is formed in the central portion of the lower cover 11 as shown in FIG. 9, and a Hall sensor assembly 50 installed adjacent to the lower end of the rotor in which a plurality of Hall sensors are mounted on a printed circuit board is arranged in the annular groove 11b to detect a rotor position signal when the rotor is rotated.

The swivel actuator 200 according to this invention may include the BLDC motor with a 20 pole-18 slot structure, for example, as the drive motor 100. In addition, when the coil 43 of the stator 40 is wound on the plurality of teeth 41, the drive motor 100 may be configured to wind the coil 43 in a U, V, and W three-phase structure, and the other ends of the U, V, and W three-phase coils 43 may be connected in a star-connection method. Moreover, the drive motor 100 may be driven by a 6-step full-wave driving method using an inverter after receiving a rotor position signal from two or three Hall sensors, for example, in a motor driving circuit.

The first and second bearings 61 and 62 which rotatably support the rotor to the hollow cylindrical portion 11a are installed between the rotor 30 and the hollow cylindrical portion 11a of the lower cover 11.

The first and second gear trains 70a and 70b are arranged on the second step portion 12b to face each other around the hollow cylindrical portion 11a, and both ends of the first and second power transmission shafts 71a and 71b are rotatably supported by a pair of bearings 74a and 74b and a pair of bearings 75a, and 75b, which are built in a pair of bearing housings 78a and 78b and a pair of bearing housings 78c and 78d, respectively.

The second step portion 12b extends from the body case 12 to the center to support the first and second gear trains 70a and 70b and the first and second pinion gear units 80a and 80b separately from the stator 40 placed below, and has a plurality of spaces for weight reduction to achieve light weight.

The first and second gear trains 70a and 70b are coupled to the outer circumferences of the first worm gear 35 respectively, and second and third worm wheels 72a and 72b gear-coupled to the first worm gear 35 are formed on one-side portions of the first and second transmission shafts 71a and 71b and second and third worm gears 73a and 73b are formed on the other-side portions of the first and second power transmission shafts 71a and 71b.

Figure 5:
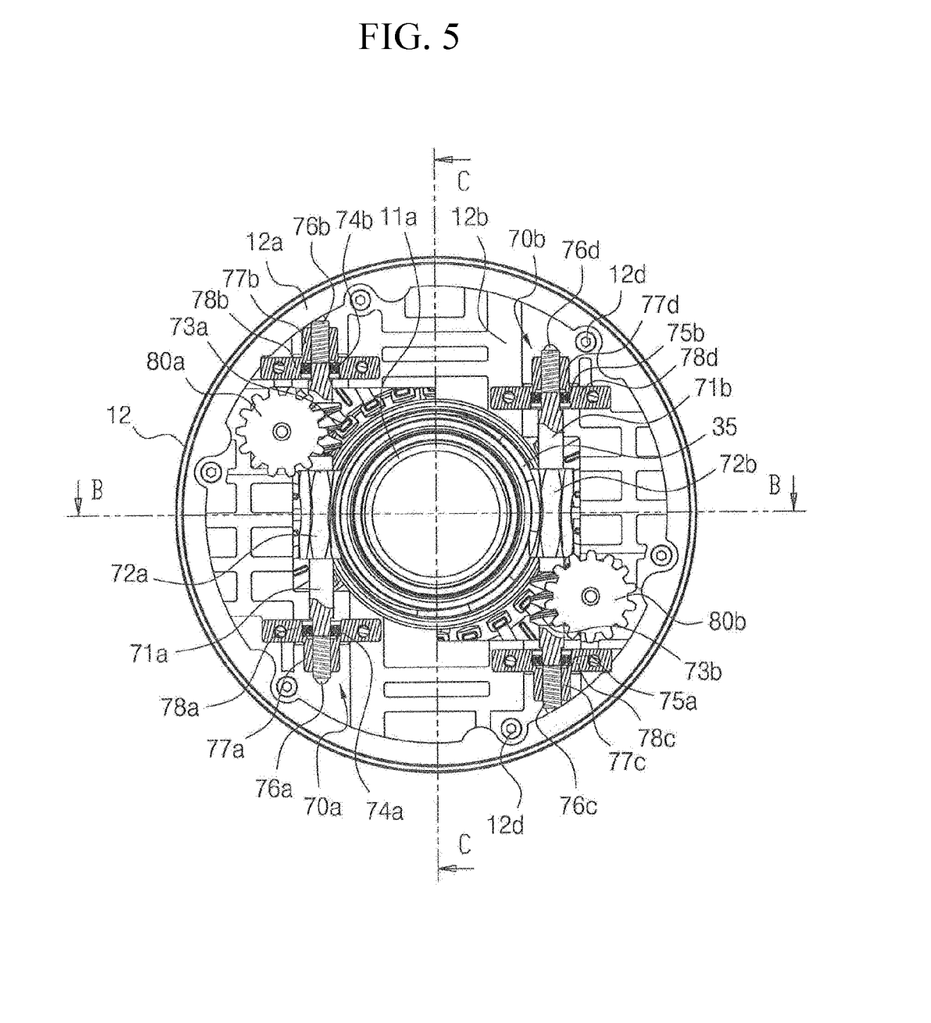

In this case, in the present invention, as illustrated in FIG. 5, Set screw assembly units 77a to 77d are extended at the rear ends of the bearing housings 78a to 78d, respectively, such that the first and second power transmission shafts 71a and 71b suppress left and right displacement from occurring in the bearing housings 78a to 78d supporting the bearings 74a, 74b, 75a, and 75b, respectively, Set screws 76a to 76d are added to the set screw assembly units 77a to 77d to limit the left and right flow of the first and second power transmission shafts 71a and 71b.

The set screws 76a to 76d each include: a male screw formed on an outer circumference of a body; and a concave groove of a "−" or "+" shape capable of accommodating a front end of a driver which is formed at a rear end thereof, wherein the front end is curved or flat.

The set screws 76a to 76d are screw-coupled with female screws respectively formed in through holes penetrating from the rear ends of the set screw assembly units 77a to 77d into the bearing housings 78a to 78d, and the front end portions of the four set screws 76a to 76d are coupled to each other in a form in which both ends of each of the first and second power transmission shafts 71a and 71b are pushed and compressed.

The set screws 76a to 76d are preferably installed in all the set screw assembly units 77a to 77d of the four bearing housings 78a to 78d respectively containing the four bearings 74a, 74b, 75a, and 75b rotatably supporting both ends of each of the first and second power transmission shafts 71a and 71b. It is also possible to suppress left and right flow by pushing the first and second power transmission shafts 71a and 71b in one direction by installing the set screws in only the one-side set screw assembly units 77a to 77d to support one-side ends of the first and second power transmission shafts 71a and 71b.

The set screws 76a to 76d may have front end portions protruding in a spherical shape to minimize contact with the ends of the first and second power transmission shafts 71a and 71b. Alternatively, it is also possible to use the set screws 76a to 76d having front end portions in a surface shape. In this invention, since the round per minute (rpm) of the drive motor 100 is few and the gear ratio thereof is large, the shapes of the front end portions of the set screws 76a to 76d are not significantly influential.

The first and second pinion gear units 80a and 80b are rotatably installed on the first and second support shafts 83a and 83b installed in the second step portion 12b, respectively, and fourth and fifth worm wheels 81a and 81b gear-coupled to the second and third worm gears 73a and 73b are formed at the lower ends thereof, respectively, and first and second pinion gears 82a and 82b are integrally formed at the upper ends thereof.

The rotary table 20 has the circular upper plate 21 and the side surface 23 extending downward from the outer circumference of the upper plate 21. A plurality of coupling holes 22 for coupling with the main body, which is a passive object installed on the rotary table 20, are penetrativity formed in the upper plate 21, and a plurality of stud nuts 26 engaged with fixed bolts 27 are attached to the coupling holes 22 on the bottom surface of the upper plate 21.

A central through hole 25 through which a cable for connecting to a motor driving circuit installed outside the swivel actuator 200 passes from a stator coil 43 of the drive motor 100 and a plurality of Hall sensors provided in the Hall sensor assembly 50 is formed at the center of the upper plate 21.

In this case, the motor driving circuit may be embedded in a space formed under the housing.

Moreover, the upper end of the hollow cylindrical portion 11a of the lower cover 11 is located in the central through hole 25, and a third bearing 63 may be integrally installed in the center of the lower surface of the upper plate 21 to rotatably support the rotary table 20 to the outer periphery of the hollow cylindrical portion 11a.

Moreover, a ring-shaped stopper 64 is inserted between the third bearing 63 and the second bearing 62 installed on the outer periphery of the hollow cylindrical portion 11a, to set the positions of the third bearing 63 and the second bearing 62.

A ring gear 24 is integrally formed inside the side surface portion 23 of the rotary table 20, and first and second pinion gears 82a and 82b of the first and second pinion gear units 80a and 80b are gear-coupled to the ring gear 24.

In addition, a ring-shaped oil seal 13 is inserted between the rotary table 20 and the body case 12, and the lower portion is supported by the first step portion 12a.

The present invention provides a power transmission structure capable of minimizing a backlash due to a gear train change structure that minimizes the number of coupled gears, by forming the second and third worm wheels 72a and 72b and the second and third worm gears 73a and 73b in an integral form at intervals in each of the first and second power transmission shafts 71a and 71b. As a result, the present invention may reduce overall size and secure a space compared to a conventional gear train in which a plurality of spur gears are combined, thereby increasing degree of freedom in design and reducing costs.

Furthermore, in this invention, the BLDC drive motor 100 is installed at the bottom of the housing 10, and the second and second worm wheels 72a and 72b and the second and third worm gears 73a and 73b are integrally formed at intervals in the first and second power transmission shafts 71a and 71b in the upper portion of the housing 10, to form the first and second gear trains 70a and 70b. By arranging the first and second gear trains 70a and 70b in a symmetrical structure on the second step portion 12b inside the housing, it is possible to minimize the backlash and suppress the occurrence of vibration.

As described above, when the first and second gear trains 70a and 70b are arranged in a symmetrical structure inside the housing, it is possible to reduce a tolerance between gears, but it is difficult to completely reduce the tolerance. That is, a gap between the gear and the gear is minimized but a tolerance between gears is generated to form a gap, and thus the rotary table 20 gear-coupled to the first and second pinion gears 82a and 82b and the driven body thereon may be shaken in the left and right directions.

This problem may be caused by the occurrence of the left and right displacement of both ends of the power transmission shafts forming the gear trains in the bearing housings 78a to 78d. In this invention, both ends of each of the first and second power transmission shafts 71a and 71b are rotatably supported by a pair of bearings 74a and 74b, and a pair of bearings 75a and 75b, respectively.

The pair of bearings 74a and 74b and the pair of bearings 75a and 75b are embedded in the bearing housings 78a to 78d fixedly installed in the second step portion 12b. In the present invention, the set screws 77a to 76d are added to the set screw assembly units 77a to 77d extending from the rear ends of the bearing housings 78a to 78d so that both end portions of each of the first and second power transmission shafts 71a and 71b suppress left and right displacement from occurring in the bearing housings 78a to 78d.

As a result, the left and right displacements of the first and second power transmission shafts 71a and 71b are suppressed to eliminate a tolerance (gap) generated when the second and third worm gears 73a and 73b of the first and second gear trains 70a and 70b and the fourth and fifth worm wheels 81a and 81b of the first and second pinion gear units 80a and 80b are gear-coupled, and In addition, the gap between the first and second pinion gears 82a and 82b of the first and second pinion gear units 80a and 80b and the ring gear 24 of the rotary table 20 may be removed to zero the backlash.

After all components of the swivel actuator 200 are assembled inside the housing 10, and by advancing the set screws 76a to 76d in one direction from the outside through the set screw adjustment through-holes 12e formed in the body case 12 of the housing 10, the compression between the set screws 76a to 76d and the first and second power transmission shafts 71a and 71b pushes the first and second power transmission shafts 71a and 71b to suppress the left and right flow of the first and second power transmission shafts 71a and 71b.

Hereinafter, an operation of the inner hollow swivel actuator 200 according to the present invention will be described with reference to FIGS. 1 to 10.

When the BLDC drive motor 100 installed on the bottom of the housing 10 is operated in the internal hollow swivel actuator 200 of this invention, the rotor 30 rotates and the first worm gear 35 formed integrally on the upper side of the rotor 30 rotates in the same direction.

When the first worm gear 35 rotates, the second and third worm wheels 72a and 72b of the first and second gear trains 70a and 70b gear-coupled to the first worm gear 35 rotate, and the first and second power transmission shafts 71a and 71b also rotate.

Accordingly, the second and third worm gears 73a and 73b formed on the other-side portions of the first and second power transmission shafts 71a and 71b rotate the fourth and fifth worm wheels 81a and 81b of the first and second pinion gear units 80a and 80b to be gear-coupled.

As a result, the second and third worm wheels 72a and 72b formed on one-side portions of the first and second power transmission shafts 71a and 71b are gear-coupled to the first worm gear 35 and the second and third worm gears 73a and 73b formed on the other-side portions thereof are gear-coupled to the fourth and fifth worm wheels 81a and 81b of the first and second pinion gear units 80a and 80b. Accordingly, the first and second gear trains 70a and 70b reduce the rotational speed of the drive motor to increase the torque, and transmit the torque-increased rotational output to the first and second pinion gear units 80a and 80b.

In addition, the first and second pinion gear units 80a and 80b are configured to rotatably drive the first and second pinion gears 82a and 82b positioned at the upper end by the rotation of the fourth and fifth worm wheels 81a and 81b and thus the ring gear 24 in which the first and second pinion gears 82a and 82b are inscribed and gear-coupled is also rotated in the same direction. As a result, the driven body coupled on the upper portion of the rotary table 20 is rotated left and right according to the rotation direction of the drive motor 100.

In the present invention, when the BLDC drive motor 100 is rotated at about 800 rpm, the BLDC drive motor 50 is decelerated to approximately 400:1 through the first and second gear trains 70a and 70b, and the rotary table 20 is reduced in rotating speed to about 2 rpm, resulting in an increase in a large torque.

As described above, in the present invention, the first and second gear trains 70a and 70b are arranged in a symmetrical structure inside the housing 10, thereby minimizing backlash and suppressing generation of vibration.

In addition, in the present invention, the set screws 77a to 76d are added to the set screw assembly units 77a to 77d extending from the rear ends of the bearing housings so that both end portions of each of the first and second power transmission shafts 71a and 71b suppress left and right displacement from occurring in the bearing housings 78a to 78d.

In the present invention, after assembling all components of the swivel actuator 200 inside the housing 10, and by advancing two set screws in one direction one by one for each of the first and second power transmission shafts 71a and 71b among the four set screws 76a to 76d installed in the set screw assembly units 77a to 77d) from the outside through the set screw adjustment through-holes 12e formed in the body case 12 of the housing 10, the first and second power transmission shafts 71a and 71b are pushed and fixed to one side, to thereby suppress the left and right movements of the first and second power transmission shafts 71a and 71b.

As a result, the left and right displacements of the first and second power transmission shafts 71a and 71b are suppressed by tightening the set screws 76a to 76d, to thereby eradicate a tolerance (gap) which may be generated during gear-coupling between the second and third worm gears 73a and 73b of the first and second gear trains 70a and 70b and the fourth and fifth worm 81a of the first and second pinion gear units 80*a* and 80*b*. In addition, the gap between the first and second pinion gears 82*a* and 82*b* of the first and second pinion gear units 80*a* and 80*b* and the ring gear 24 of the rotary table 20 may be removed to zero the backlash.

In addition, the present invention is provided with an output worm gear of a multiple thread screw as a gear train to prevent a reduction gear ratio from increasing while lowering the rpm of a drive motor, which is a factor of noise increase.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

The swivel actuator according to the present invention may be applied for rotating, together with a rotary table, a passive object installed in the rotary table.

What is claimed is:

1. A drive motor for a swivel actuator comprising:
a cylindrical housing in which a hollow cylindrical portion protrudes from a bottom of a center thereof and a step portion protrudes from an inner side wall thereof;
a rotor rotatably coupled to an outer circumference of the hollow cylindrical portion; and
a stator arranged on the bottom of the housing to rotate the rotor by generating a rotating magnetic field while having an air gap on an outside of the rotor, wherein
a first worm gear is integrally formed on an outer circumferential portion of an extension unit extending to an upper portion of the rotor, and the stator is arranged below the step portion.

2. The drive motor for a swivel actuator of claim 1, wherein the rotor further comprises:
a rotor support with a cup-shaped lower end; and
at least one bearing arranged between the cup-shaped lower end of the rotor support and a lower end of the hollow cylindrical portion to rotatably support the rotor.

3. The drive motor for a swivel actuator of claim 1, wherein the housing comprises:
a cylindrical body case having open upper and lower portions and a step portion protruding inside; and
a circular lower cover having an outer circumferential portion fixed to a lower end of the body case and a hollow cylindrical portion protruding from a center thereof, wherein
the drive motor is arranged on the lower side of the step portion and a reduction gear train and a pinion gear unit are installed on an upper portion of the step portion.

4. The drive motor for a swivel actuator of claim 3, further comprising:
a rotary table rotatably installed between the body case of the housing and the hollow cylindrical portion and having a driven body installed on an upper surface thereof; and
a third bearing rotatably supporting the rotary table on the outer circumference of the hollow cylindrical portion.

5. The drive motor for a swivel actuator of claim 4, further comprising an oil seal installed between the rotary table and the housing.

6. A swivel actuator comprising:
a cylindrical housing in which a hollow cylindrical portion protrudes from a bottom of a center thereof and first and second step portions protrude from an inner side wall thereof;
a drive motor which is arranged on a bottom surface of the housing and has a cylindrical first worm gear integrally formed on an outer circumference of a cylindrical extension unit extending to an upper portion of the rotor;
first and second gear trains which are arranged to face each other on the upper portion of the second step portion, respectively, and are coupled to the outer circumference of the first worm gear in which second and third worm wheels gear-coupled to the first worm gear are respectively formed on either one side of first and second power transmission shafts, and second and third worm gears are respectively formed on the other sides of the first and second power transmission shafts;
first and second pinion gear units having fourth and fifth worm wheels formed at lower ends thereof to be gear-coupled to the second and third worm gears, respectively, and having first and second pinion gears integrally formed at the upper ends thereof;
a rotary table in which the first and second pinion gears of the first and second pinion gear units are gear-coupled to a ring gear formed integrally on an inner side of a side surface portion thereof to rotate; and
a plurality of set screws for pushing and fixing the first and second power transmission shafts to one side, wherein
the axial displacement of the first and second power transmission shafts is suppressed by tightening the set screws from the outside through set screw adjustment through-holes formed in the housing.

7. The swivel actuator of claim 6, wherein
the cylindrical extension unit extending to the upper portion of the rotor and the cylindrical first worm gear are vertically set on the bottom surface of the housing,
the first and second power transmission shafts are installed in a horizontal direction orthogonal to the axis of the cylindrical first worm gear, respectively, and
the first and second support shafts are installed in a vertical direction orthogonal to the first and second power transmission shafts, respectively.

8. The swivel actuator of claim 6, wherein, when the rotor and the first worm gear of the drive motor rotate clockwise, the first and second power transmission shafts rotate counterclockwise, and the first and second support shafts and the rotary table rotate clockwise.

9. A swivel actuator comprising:
a cylindrical housing having a hollow cylindrical portion protruding in a vertical direction from a bottom thereof at a center thereof;
a brushless direct-current (BLDC) drive motor installed on the bottom of the housing in a vertical direction to allow a rotor to rotate around a hollow cylindrical portion;
a cylindrical first worm gear integrally formed on an outer circumference of a cylindrical extension part extending to an upper portion of the rotor;
first and second gear trains each having one side coupled to an opposite outer circumference of the first worm gear to reduce a rotational speed of the drive motor to generate a torque-increased rotational output;

a rotary table having a central portion rotatably coupled to the hollow cylindrical portion of the housing and a ring gear integrally formed inside a side surface portion thereof; and first and second pinion gear units of which lower end portions are respectively coupled to the other sides of the first and second gear trains and upper end portions are inscribed in an inner circumferential portion of the ring gear facing the ring gear, to transfer a torque-increased rotational output to the rotary table, wherein the first and second gear trains include first and second power transmission shafts each having a worm wheel formed on one side thereof to be gear-coupled to the first worm gear and a second worm gear formed on the other side thereof to be gear-coupled to the ring gear, and one or both ends of each of the first and second power transmission shafts are supported by a plurality of set screws to suppress the occurrence of axial displacement.

10. The swivel actuator of claim 9, wherein the first and second power transmission shafts each further comprise:

a pair of bearings installed in a step portion protruding from an inner wall of the cylindrical housing to support both ends to be able to rotate;

a pair of bearing housings that accommodate and support the pair of bearings;

a pair of set screw assembly units formed to extend from the rear ends of the pair of bearing housings; and a pair of set screws which are screw-coupled to the set screw assembly units so that a front end portion thereof supports end portions of the power transmission shafts, wherein the set screws may suppress axial displacement of the first and second power transmission shafts by pushing and fixing the first and second power transmission shafts to one side from the outside through set screw adjustment through-holes formed in the housing.

11. The swivel actuator of claim 10, wherein the set screws each comprise:

a male screw on an outer circumference of a body; and a concave groove capable of accommodating a front end of a driver which is formed at a rear end thereof, wherein the front end is curved or flat, and the front ends of the set screws are compressed and coupled by pushing one or both ends of the first and second power transmission shafts.

12. The swivel actuator of claim 9, wherein the drive motor comprises:

a rotor provided with a rotor support which is rotatably coupled to the outer circumference of the hollow cylindrical portion and has a lower end portion which is formed in a cup shape; and a stator arranged on the bottom of the housing outside the rotor, to rotate and drive the rotor, wherein the swivel actuator further comprises:

a lower bearing arranged between the cup-shaped lower end of the rotor support and a lower end of the hollow cylindrical portion of the housing to rotatably support the rotor; and an upper bearing rotatably supporting the rotary table on the outer circumference of the hollow cylindrical portion.

13. The swivel actuator of claim 12, further comprising a ring-shaped stopper inserted between the lower bearing and the upper bearing installed on the outer circumference of the hollow cylindrical portion to set the positions of the lower bearing and the upper bearing.

14. The swivel actuator of claim 9, wherein the rotary table comprises:

an upper plate on which a driven body is installed;

a side surface portion extending downward from an outer circumferential portion of the upper plate; and a ring gear integrally formed inside the side surface portion, wherein the first and second pinion gears of the first and second pinion gear units are gear-coupled to the ring gear of the rotary table.

* * * * *